United States Patent [19]

Mori

[11] Patent Number: 5,048,767

[45] Date of Patent: Sep. 17, 1991

[54] CUTTER FOR SHREDDER

[75] Inventor: Chuzo Mori, Tokyo, Japan

[73] Assignee: Carl Manufacturing Co., Ltd., Tokyo, Japan

[21] Appl. No.: 506,803

[22] Filed: Apr. 10, 1990

[30] Foreign Application Priority Data

Apr. 12, 1989 [JP] Japan .................................. 1-42673[U]
Jul. 27, 1989 [JP] Japan .................................. 1-88469[U]
Oct. 30, 1989 [JP] Japan ................................ 1-282584[U]

[51] Int. Cl.$^5$ ............................................ B02C 18/06
[52] U.S. Cl. .................................... 241/236; 241/287; 241/295
[58] Field of Search ................ 241/236, 243, 295, 287

[56] References Cited

U.S. PATENT DOCUMENTS 3,730,043  5/1973  Zimmermann ............... 241/236 X
3,746,267  7/1973  Myers et al. .................. 241/236 X
4,869,435  9/1989  Pistorius et al. .............. 241/236 X Primary Examiner—Timothy V. Eley
Attorney, Agent, or Firm—Oliff & Berridge

[57] ABSTRACT

A cutter for a shredder comprising a cutter blade formed by a plurality of rotation blades disposed and spaced parallel to each other on a shaft, and a cylinder made of a resilient material having on the circumference thereof a plurality of annular grooves which are inserted by the blades when those two are assembled with both shafts pivoted on the frame parallel to each other.

8 Claims, 5 Drawing Sheets

CUTTER FOR SHREDDER

BACKGROUND OF THE INVENTION

1. Field of the invention

The present invention relates to a cutter for shredder.

1. Prior art

In the conventional cutter of the shredder, it consists of, as shown in FIG. 8, a pair of cutter member comprising a plurality of rotation blades 16 having square edges 17 provided parallel to each other, which are adapted to be rotated and rubbed against each other at the edges 17.

And in order to shred papers, as shown in FIG. 9, the paper 18 is rolled in by the rotation blades 16 which are rotated in the direction of an arrow and shredded.

In more detail, the force of rolling in the paper 18 inserted in the shredder is given at the cross section X in FIG. 9, where the paper is cut by shear force.

In the conventional shredder, since papers have been cut into pieces by the shear force of the rubbing of the edges of the pair of blades, so that, in order to shred papers, a strong shear force is needed and consequently a big torque for driving the rotation blades 16 is also needed, which causes the driving means to become large in size.

Further, it is customary to cause damage to the blades in operation by the existence of the metal tips such as staples included in the papers to be shredded.

Accordingly, one object of the present invention is to provide a novel cutter for use in a shredder which solves the above conventional problems.

Another object of the present invention is to provide a novel cutter for preparation of a shredder which is small in size, having a high level of shredding ability and small in energy consumption.

SUMMARY OF THE INVENTION

A cutter for shredder according to the present invention is constituted of:

A cutter of shredder comprising;

a cutter blade comprising a plurality of parallel rotation blades disposed and spaced at constant intervals on a shaft, a cylinder on the circumference of which a plurality of annular grooves are provided at such intervals as the said blades are inserted at every center of the width of the groove, said shaft of the cutter blade and said cylinder being pivoted on a frame parallelly and rotatably so that the tips of the blades are located in the grooves respectively.

In the above cutter, the cutter blades are formed by disposing a plurality of discs on a shaft.

Further in the above cutter, the cylinder is formed with a resilient material such as plastic.

Still further, in the above cutter, it is provided with a transmission device which makes the circumference rotation velocity larger than that of the cylinder.

The operation of the shredder using the cutter according to the present invention is as follows:

The papers inserted in the shredder is put on the circumference of the rotating cylinder by bridging the annular grooves and continued to be pushed until the edge of the paper abuts the rotation blade, subsequently the blade pushes the paper at the center of the groove which causes a friction between the paper and the outer circumference of the cylinder, thereby the paper is rolled in. Since the blades push the paper at every groove, the paper bridging the plural grooves is tensioned at every groove so that the paper is very easily cut by the blade continuously while rotating. The paper continues to be tensioned by the blade and simultaneously cut, so that the extent of the tension of the paper is inversely proportional to the sharpness of the blade. In other words, the more sharp the blade is, the smaller the resistance to the rotation blade and the torque required to rotate it become.

Further, according to the other constitution of the present invention, since the cylinder is made of a resilient material, even if there are metal chips included in the papers which, otherwise, may stop the rotation of the cutter or damage the blade, of damage to the blade is avoided by the deformation of the cylinder while continuing to cut the paper.

Further, according to the other constitution of the present invention, since the circumference velocity of the cutter blade is larger than the one of the cylinder, the paper having the same velocity as the cylinder is more easily cut by the pulling action of the blade against the paper.

BRIEF EXPLANATION OF THE DRAWINGS

FIG. 1 is a plan view of one embodiment of the present invention,

FIG. 2 is an exploded and perspective view of the cutter blade of the present invention, FIG. 3 is a perspective view of a cutter of the present invention, FIG. 4 is a vertical sectional view of FIG. 3, FIG. 5 is a plan view at the time of shredding, FIG. 6 is another embodiment of the cutter blade of the present invention, FIG. 7 is a partially enlarged view of the state where the shredding process is carried out by the rotation blade of FIG. 6, FIG. 8 is a plan view of a conventional art and FIG. 9 is a plan view at the time of shredding in the conventional art.

EXPLANATION OF THE PRESENT INVENTION

Hereinafter, the present invention is explained in more detail on the embodiment illustrated.

Figure 1:
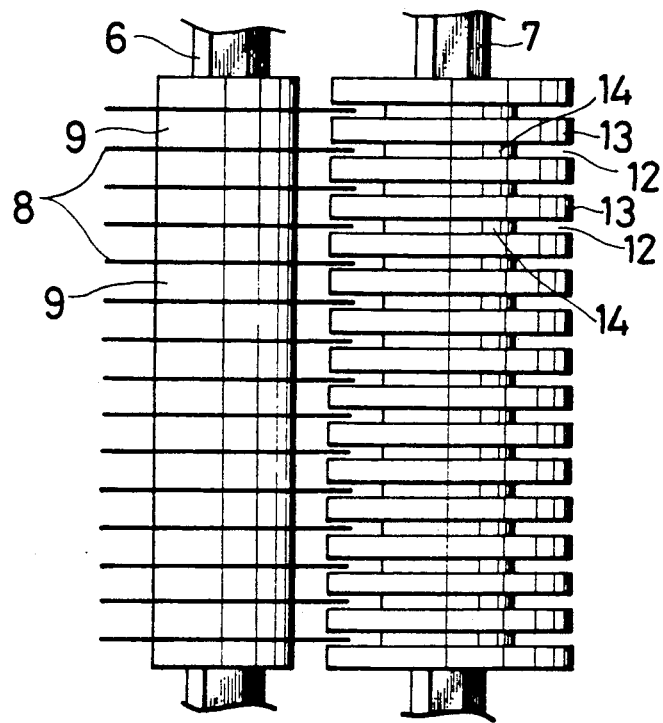
FIGS. 1-7 show one embodiment of the present invention and FIGS. 8-9 show the prior art.

In FIG. 1, a plurality of the rotation blades 8 made of steel are arranged on a shaft through spacers 9. The cutter blade comprises alternating rotation blades 8 and spacers 9 rotatably mounted by hexagonal shaft 6 wherein both ends of the cutter blade are threaded to form screw portions 10 and tightened by nuts 11 on both ends.

13 is a disc made of a resilient material and in this embodiment plural annular grooves 12 are formed by assembling the plural discs 13 and plural spacers 14 on a shaft 7 in the same manner as the cutter blade. It is a matter of course that the assembled body can be molded to form the annular groove 12 by molding integrally without assembling the elements such as spacers 14 and discs 13.

Figure 3:
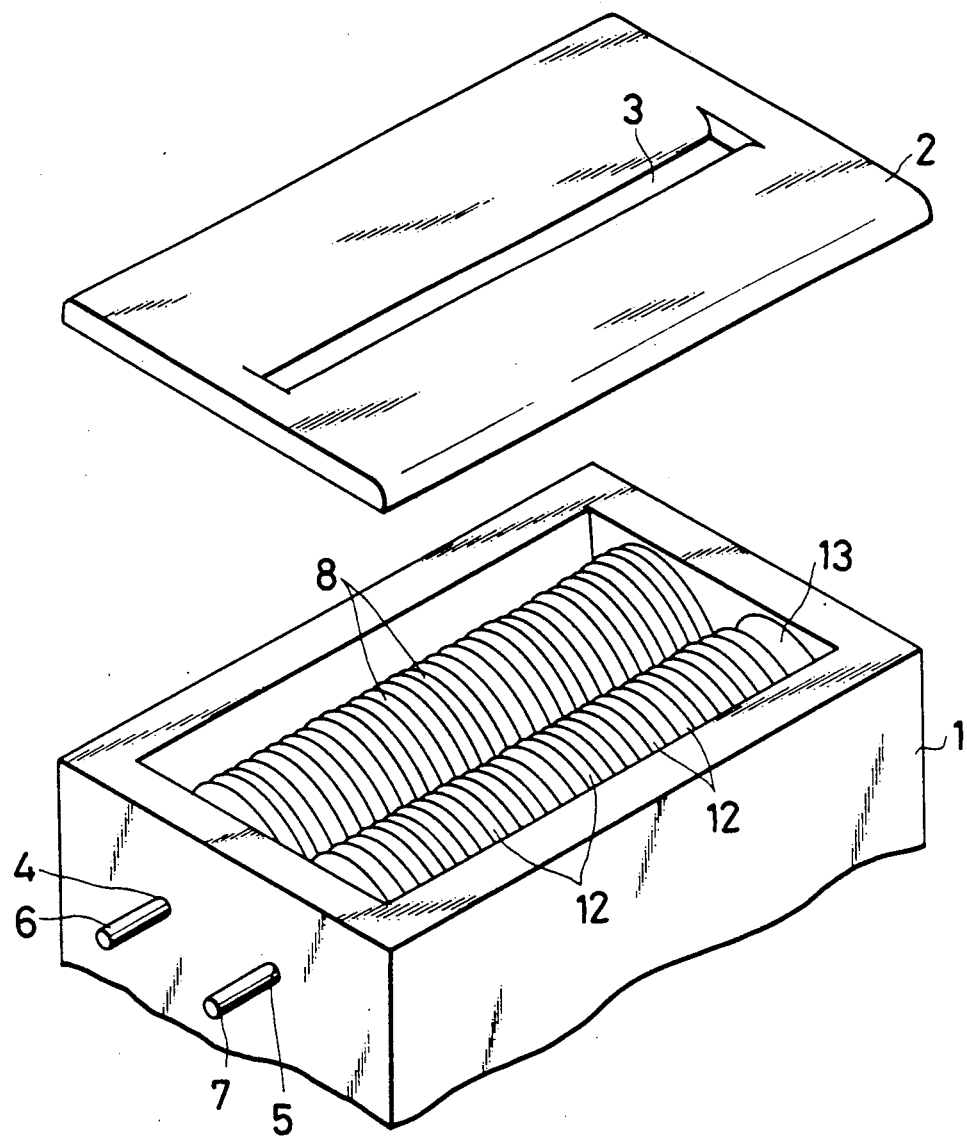
Figure 4:
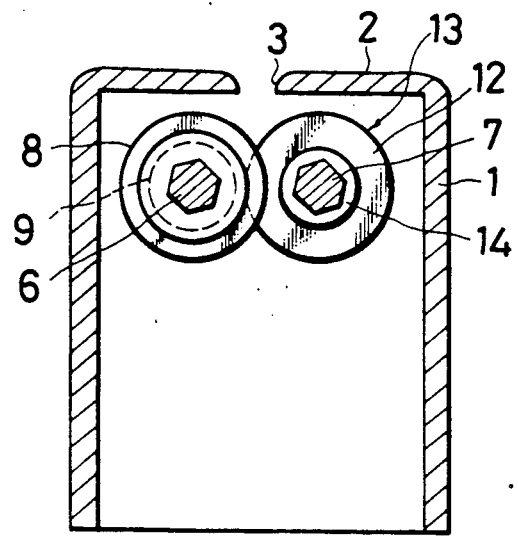
Figure 5:
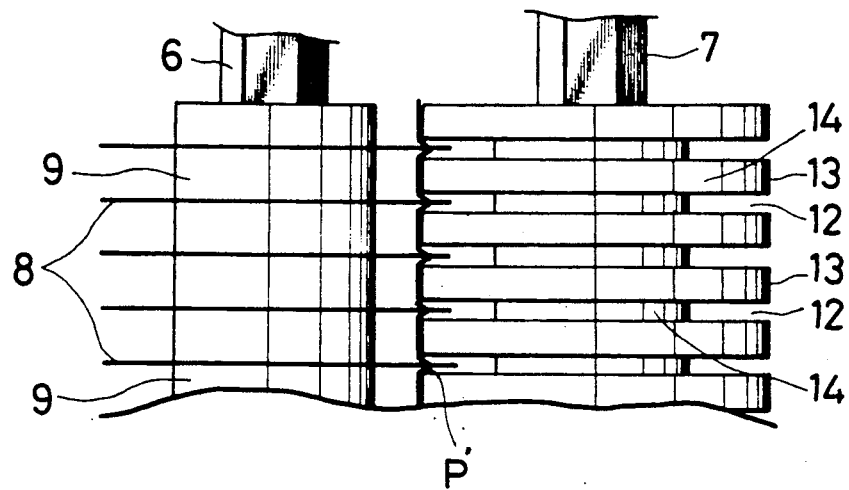

Referring to FIGS. 3 and 4, by pivoting the shafts 6 and 7 in the holes 4 and 5 of the casing 1 the cutter blade and the cylinder are assembled to the casing 1, and this casing 1 is covered by a cover 2 having an opening 3 for inserting paper.

While this cutter is driven by a drive source such as a motor (not shown) connected to either shaft 6 or 7 and the other is connected through a gear train (not shown). As to this gear train, it can be of such gear ratio as the difference of the circumference velocity between the cutter blade and the cylinder is realized, i.e. the cutter blade rotates faster than the cylinder. As a drive means of the cutter it may be a handle in place of the motor.

In practice, the paper P to be shredded is inserted in the opening 3 of the cover 2 and the paper is pushed by sliding on the cylinder until the edge thereof abut the rotation blade. Subsequently, as the cutter blade rotates, the edge of the paper P is pushed down along the curvature of the blade 16, which causes a tension on the paper bridging on each groove 12 to give friction on the cylinder 13, thereby the paper is further rolled in. By contact of the rotation blade 16 on the paper the paper is tensioned between the adjacent contact points, which leads to an easy cutting by the blade 16.

Figure 2:
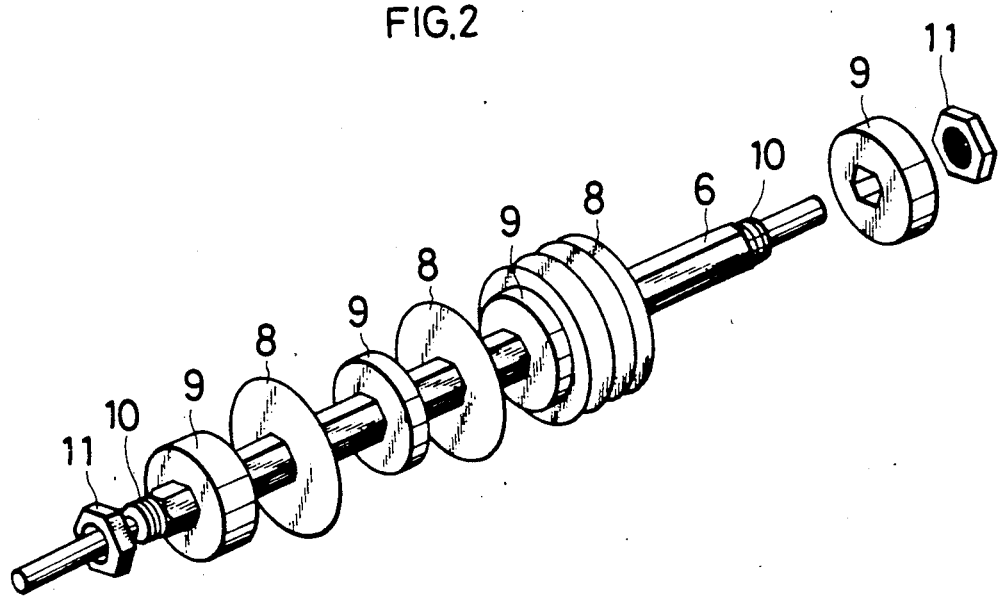

In the embodiment of FIG. 2, the diameters of the cutter blade and the cylinder are adapted to be, approximately identical, but this does not preclude employing different diameters to obtain the same effects. Further, as to the blade, it may be replaced by, for instance, a saw-toothed type, the advantage of which is to obtain an excellent effect in pulling the paper P.

Figure 6:
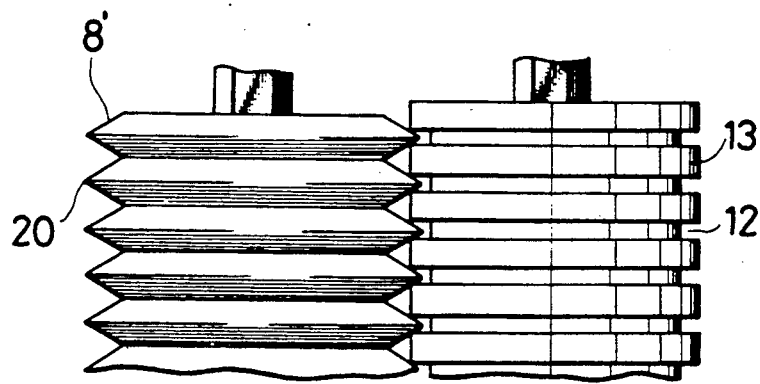
Figure 7:
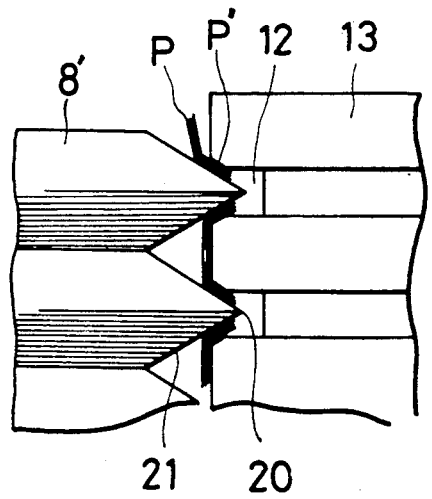
Figure 8:
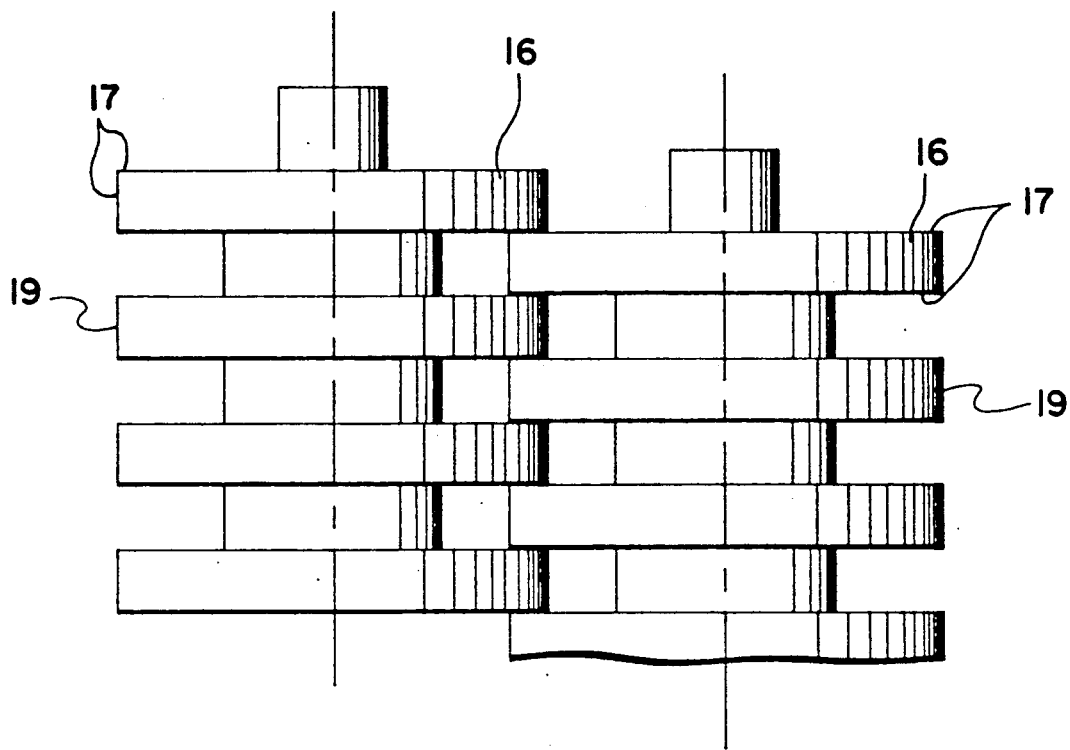
Figure 9:
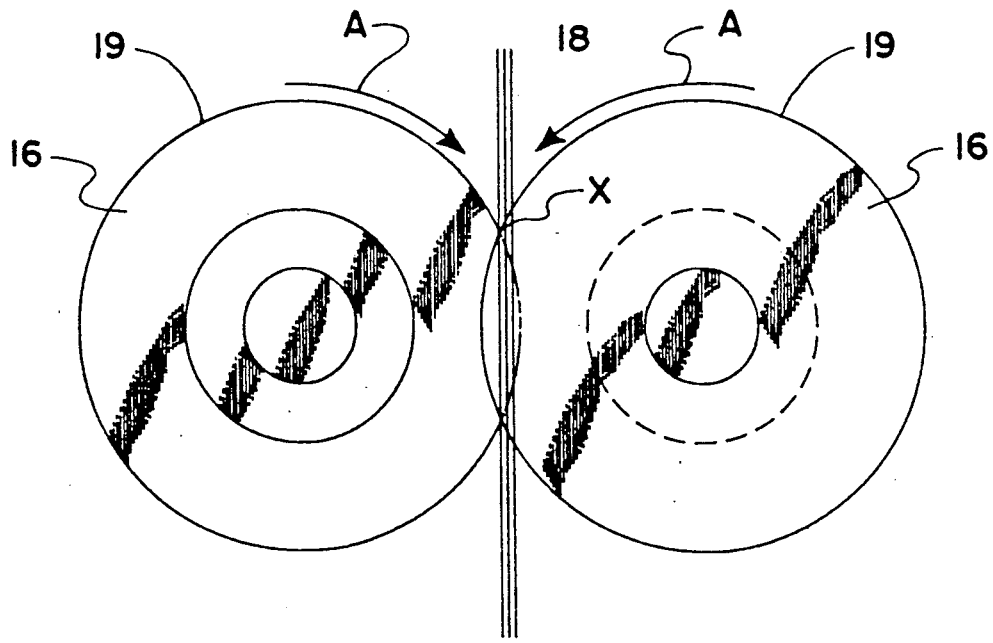

In FIG. 6 is illustrated another variation of the rotation blade 8. The tip end 20 of the rotation blade 8' of this variation has a triangle form in section and the rotation blade 8' has two symmetrical slopes 21 which are in contact with the corners of the both walls of the groove 12. In operation, the cut paper end P' of the paper P is, as shown in FIG. 7, clamped between the slope 21 and the corner, so that the paper P is more firmly rolled in.

As explained above, according to the present invention compared to the conventional art, there are many advantages as such as:
   no rubbing operation between the blades;
   reduction of expensive blades to half;
   low energy consumption for driving;
   miniaturization of the size; and
   low cost for manufacturing.

What is claimed is:
1. A cutter for a shredder comprising:
   a cutter blade having a plurality of rotation blades having tips, said rotation blades being disposed and spaced parallel to each other on a shaft;
   a bladeless cylinder whose circumference is provided with a plurality of annular grooves at such intervals as to be in cooperating relationship with the rotation blades when said cutter blade and said cylinder are assembled in a casing parallel to each other;
   said shaft of the cutter blade and said cylinder being pivotably mounted on a casing parallel to each other such that each tip of the rotation blades is located at a center of a width of an annular groove and both said shaft and said cylinder being connected through a gear train.

2. A cutter for shredder according to claim 1, wherein said rotation blade is made of steel and a blade is formed on a circumference thereof.

3. A cutter for shredder according to claim 2, wherein the rotation blade is saw-toothed.

4. A cutter for shredder according to claim 1, wherein said rotation blade has a V-shaped profile in section having symmetrical slopes.

5. A cutter for shredder according to claim 4, wherein said cylinder is made of a resilient material.

6. A cutter for shredder according to claim 4, wherein the slopes of blade are in contact with the corners of the annular groove on a line connecting a center of the cutter blade and a center of the cylinder.

7. A cutter for shredder according to claim 1, wherein a speed of rotation of said cutter blade is greater than a speed of rotation of the cylinder.

8. A cutter for shredder according to claim 1, wherein both cutter blade and cylinder have the same revolution angle and a diameter of the cutter blade is larger than a diameter of the cylinder.

* * * * *